(12) United States Patent
Monyak et al.

(10) Patent No.: US 6,601,620 B1
(45) Date of Patent: Aug. 5, 2003

(54) STUMP GRINDING BIT AND TIP THEREFOR

(75) Inventors: Kenneth Monyak, Abingdon, VA (US); Lars-Åke Carlsson, Sandviken (SE)

(73) Assignee: Sandvik Rock Tools, Inc., Bristol, VA (US)

( * ) Notice: Subject to any disclaimer, the term of this patent is extended or adjusted under 35 U.S.C. 154(b) by 0 days.

(21) Appl. No.: 10/061,215

(22) Filed: Feb. 4, 2002

(51) Int. Cl.[7] .................. A01G 23/06; B27C 1/00; B27G 13/07
(52) U.S. Cl. .................. 144/24.12; 83/840; 83/853; 144/241; 144/334; 299/108; 299/111; 299/113; 407/46; 407/113; 407/115
(58) Field of Search .................. 83/840, 853, 855; 144/24.12, 218, 237, 241; 299/79.1, 108, 100, 110, 111, 112, 113; 407/46, 7, 113, 115, 118, 64

(56) References Cited

U.S. PATENT DOCUMENTS

| | | | |
|---|---|---|---|
| 4,626,140 A | * 12/1986 | Zweekly et al. | 407/114 |
| 4,738,291 A | * 4/1988 | Isley | 144/241 |
| 5,135,035 A | 8/1992 | Mills | |
| 5,168,907 A | * 12/1992 | Herrington et al. | 144/241 |
| 5,261,306 A | * 11/1993 | Morey et al. | 144/241 |
| 5,279,345 A | 1/1994 | LeMaux et al. | |
| 5,478,175 A | * 12/1995 | Kraemer | 407/7 |
| 5,497,815 A | 3/1996 | Bowling | |
| 5,582,353 A | 12/1996 | Willibald | |
| 5,653,274 A | * 8/1997 | Johnson et al. | 407/113 |
| 5,743,314 A | 4/1998 | Puch | |
| 5,827,016 A | * 10/1998 | Strand | 407/115 |
| 6,047,749 A | * 4/2000 | Lamb | 144/24.12 |

* cited by examiner

*Primary Examiner*—W. Donald Bray
(74) *Attorney, Agent, or Firm*—Burns, Doane, Swecker & Mathis, LLP

(57) ABSTRACT

A stump cutter includes a rotary drum, holders mounted on the drum, and cutting bits mounted in respective bores of each holder for rotation relative thereto. Each cutting bit includes a shank having a pocket formed in a front end thereof in which the cutting tip is brazed, wherein an outer lip of the shank tightly grips an outer side surface of the cutting tip with a thermal shrink fit. The cutting tip includes a circular cutting edge formed by the intersection between portions of the front surface and side surface of the cutting tip, which surface portions intersect at a ninety degree angle. The front surface of the cutting tip includes raised radial ribs spaced circumferentially therearound for inducing rotation of the cutting bit during a cutting operation.

17 Claims, 4 Drawing Sheets

STUMP GRINDING BIT AND TIP THEREFOR

BACKGROUND OF THE INVENTION

The present invention relates to cutting tools for use in an apparatus for disintegrating material, such as a tree stump grinding machine.

Conventional stump grinders are disclosed in U.S. Pat. Nos. 5,135,035; 5,279,345; 5,497,815; 5,582,353; and 5,743,314, for example. A typical tree stump grinding machine comprises a rotatable wheel having a plurality of cutting assemblies mounted thereon. The wheel is rotated while adjacent to the stump, and the cutter teeth are moved into contact with the stump. As a result, the stump is gradually disintegrated.

A stump grinder of the type disclosed in U.S. Pat. No. 5,135,035 is depicted herein in FIG. 1. That cutter device 10 includes a rotary shaft 12 to which a hub 14 is attached. A plurality of cutters 16 is mounted around the outer periphery of the hub. Each cutter 16 includes a holder 18, and a cutter plate 20 soldered in a groove formed in an outer end of each holder 18. Each holder includes a fork-shaped base comprised of two parallel legs 22 (only one depicted). The legs straddle the hub and are secured thereto by a fastening screw 24.

A stump grinder of the type disclosed in U.S. Pat. No. 5,135,035 is depicted herein in FIGS. 2 and 3. That grinder 30 includes a holder 32 and a cutter bit 34 mounted therein. The holder 32 is adapted to be secured to a rotary hub (not shown). The cutter bit 34 includes a base 36 and a carbide cutting tip 38 affixed thereto. The base 36 includes a forwardly facing flat surface 40 having a center cylindrical pin 42 projecting forwardly therefrom. The carbide tip 38 has a center hole for receiving the pin 42, and a concavely recessed front face 44 bordered by a circular cutting edge 46. The cutting edge is formed by the intersection of the front face 44 and a side face which intersect one another at an acute angle a. The base 34 includes a cylindrical shank 48 mounted in a hole 50 of the holder 32 by a roll pin 52, permitting the cutter bit to rotate freely about its center axis x, thereby enabling wear to be distributed more evenly around the cutting edge. That is in contrast to the cutter of FIG. 1 wherein the plate 20 is stationary relative to the body in which it is mounted.

The cutter bit 34 of FIGS. 2–3 works satisfactorily when cutting in wood, but when the bit contacts the ground, e.g., to cut parts of the stump close to, or buried in, the ground, the cutting edge tends to quickly fracture, causing large chunks of the tip to fall off. Thus, catastrophic failure of the tip quickly occurs. Also, although the shank is mounted for free rotation in the holder, to produce more uniform wear around the cutting edge, the rotation of the shank induced by contact with the material being cut is somewhat haphazard and may not result in a satisfactorily uniform wear distribution, resulting in a premature failure of the tip.

Therefore, it would be desirable to provide a cutter bit which is less susceptible to catastrophic failure, and exhibits a more uniform wear distribution.

SUMMARY OF THE INVENTION

One aspect of the present invention relates to a cutting tip for stump cutting, which comprises a body formed of a hard material (for example, cemented carbide). The body has a rear supporting surface, a front cutting surface, and a side surface extending between the supporting surface and the cutting surface. An outer peripheral portion of the cutting surface and a forward portion of the side surface intersect one another at substantially a ninety degree angle to form a generally circular cutting edge. An inner portion of the cutting surface disposed radially inwardly of the outer peripheral portion is axially recessed relative to the outer peripheral portion. A center hole extends through the body from the cutting surface to the supporting surface. A plurality of circumferentially spaced, raised ribs extend generally radially along at least a portion of the cutting surface.

Another aspect of the invention pertains to a cutting bit which comprises a shank. The shank defines a center axis and has a rear mounting portion and front head portion. The head portion includes a front face having a center post projecting axially from the front face. A generally circular lip projects forwardly and extends around an outer periphery of the front face. The front face and the lip form a pocket surrounding the post. The post extends forwardly past the pocket. The lip engages a side surface of the cutting tip, and the post extends through the center hole of the cutting tip.

Another aspect of the invention pertains to a rotary cutter which comprises a rotary wheel, a holder mounted on the wheel and forming a bore, and a cutting bit mounted in the bore. The cutting bit comprises the shank and the cutting tip brazed thereto.

BRIEF DESCRIPTION OF THE DRAWINGS

The objects and advantages of the invention will become apparent from the following detailed description of a preferred embodiment thereof in connection with the accompanying drawings in which like numerals designate like elements and in which.

DETAILED DESCRIPTION OF A PREFERRED EMBODIMENT OF THE INVENTION

Figure 4:
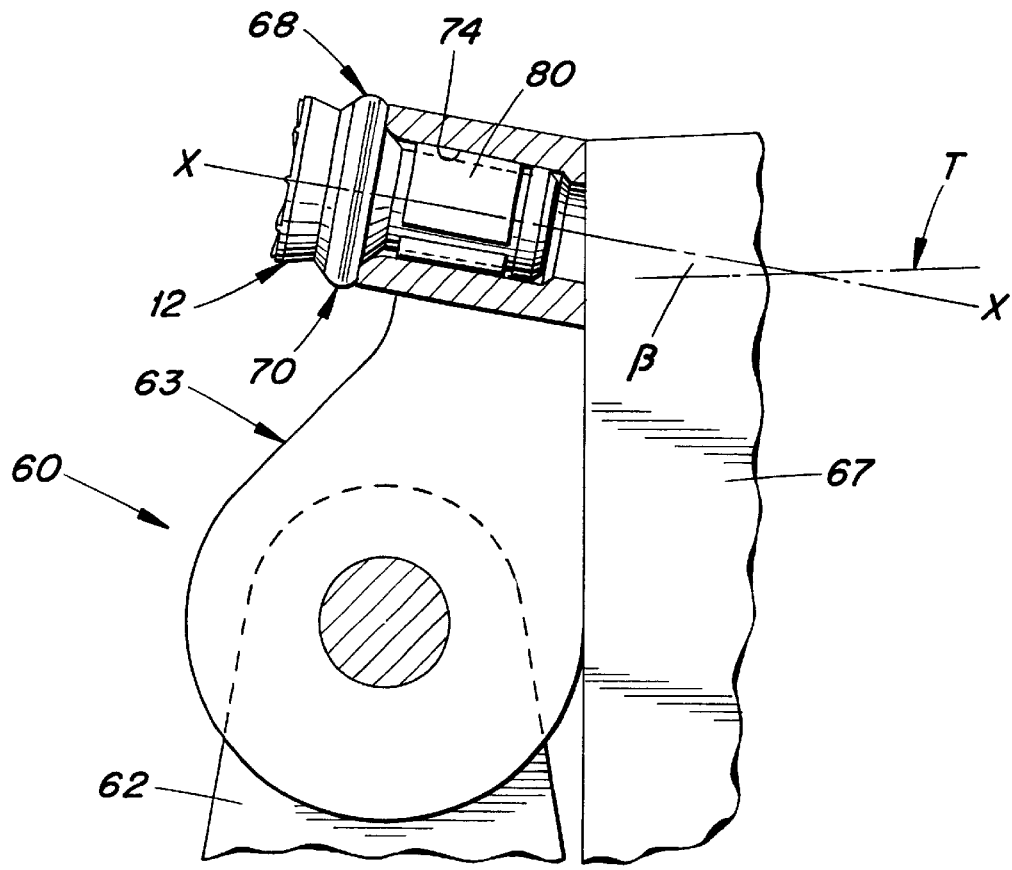
FIG. 4 is a fragmentary side elevational view of stump cutter according to the present invention, with a portion of a holder thereof broken away to expose a cutting bit according to the present invention.

Depicted in FIGS. 4 and 5 is a section of a stump grinder 60 which includes a rotary drum 61 having a plurality of lugs 62 mounted thereon, e.g., by welding. Only one lug 62 is depicted, but typically the drum would have lugs arranged in axially and circumferentially spaced relationship with reference to the drum axis. Attached to each lug 62 is a cutting tool which includes a holder 63 and a pair of cutter bits 68 mounted in respective sockets 65 of the holder for rotation relative thereto. The holder 63 includes a pair of legs 63a which straddle the lug 62 and are attached thereto, e.g., by a bolt 66. The drum rotates in the direction of the arrow R in FIG. 4. Rotation of the holders 63 relative to the lugs 62 can be prevented in any suitable way, e.g., by stop blocks 67 attached to the drum behind each holder 63.

Figure 1:
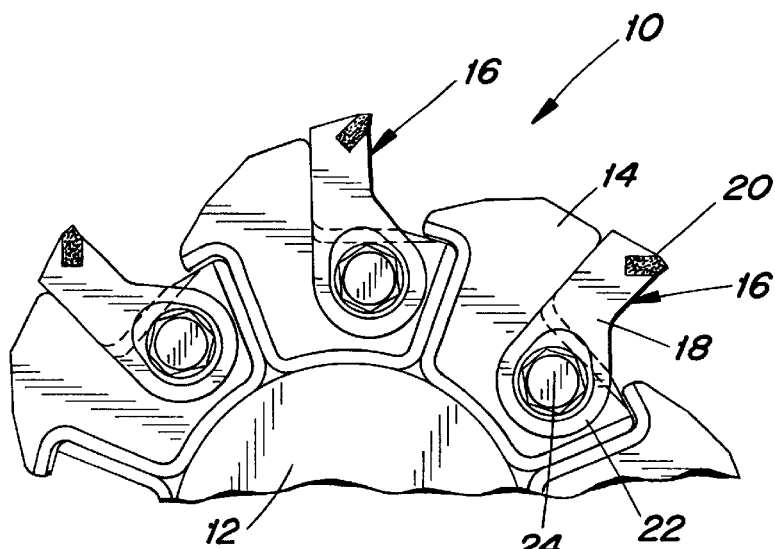
FIG. 1 is a fragmentary side elevational view of one type of prior art stump cutter.
Figure 2:
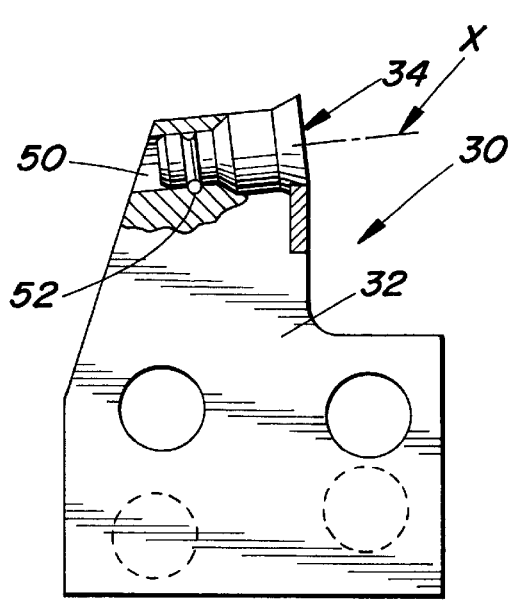
FIG. 2 is a side elevational view, partly broken away, of a cutting bit of another type of stump cutter.
Figure 3:
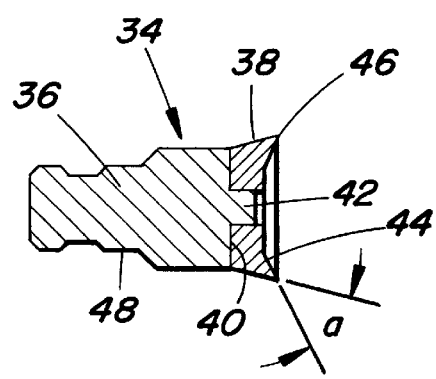
FIG. 3 is a longitudinal sectional view taken through the cutting bit of FIG. 2.

Each cutter bit 68 includes a shank 70 and a tip 72 brazed thereto. The holder 63 includes a bore 74 in which a rear mounting portion 76 of the shank 70 is disposed. That mounting portion 76 includes a recess 78 for enabling the shank to receive a conventional elastic split-sleeve retainer 80 which frictionally retains the shank within the bore, while permitting the shank to rotate relatively freely under the action of cutting forces. Alternatively, a roll pin of the type shown at 52 in FIG. 2 could be employed.

Figure 7:
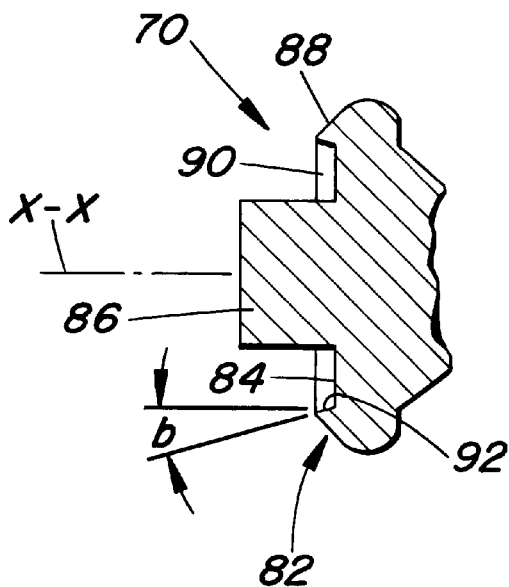
FIG. 7 is a fragmentary longitudinal sectional view of the shank depicted in FIG. 6.

A front enlarged head portion 82 of the shank 70 includes a flat front face 84 having a center post 86 projecting forwardly therefrom along the longitudinal axis X—X of the shank (see FIG. 7). A diameter of the post is equal to at least one-half of a diameter of the front face 84. A circular lip 88 projects forwardly and extends around an outer periphery of the front face 84. The lip 88 is spaced radially from the post 86, so a pocket 90 is formed around the post 86, with the post projecting forwardly past the pocket.

An inner face 92 of the lip 88 is inclined in a forward and radially outward direction to form an acute angle b relative to the axis (see FIG. 7).

Figure 10:
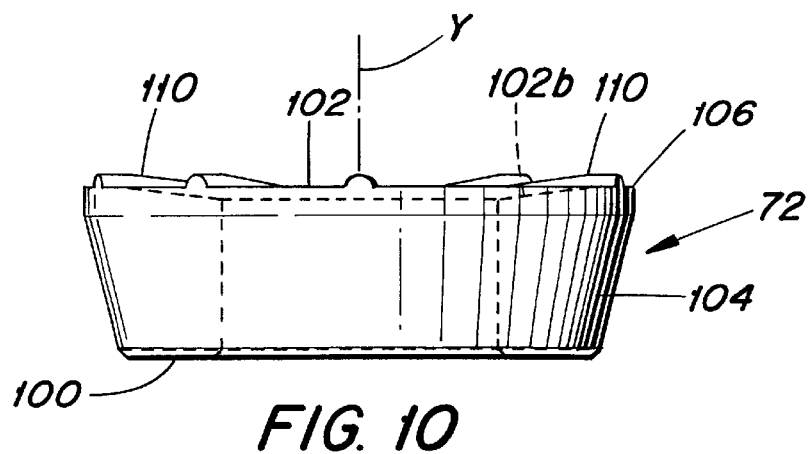
FIG. 10 is a side elevational view of a cutting tip according to the present invention.
Figure 11:
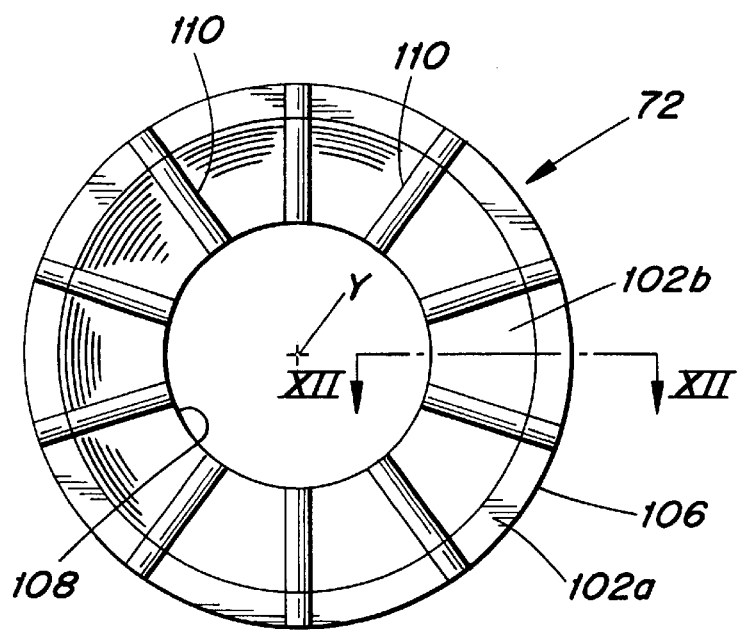
FIG. 11 is a front elevational view of the cutting tip of FIG. 10.
Figure 12:
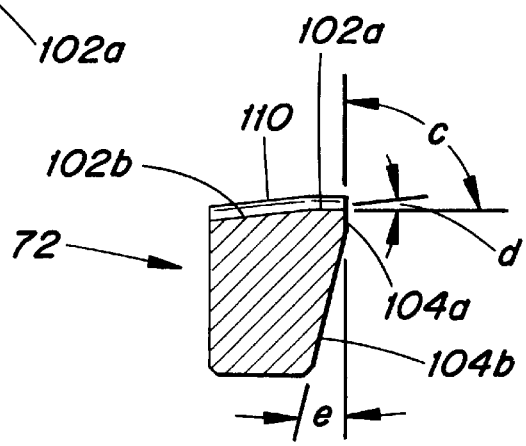
FIG. 12 is a cross sectional view taken along the line XII—XII in FIG. 11.

The cutting tip 72, which is best shown in FIGS. 10–12, is formed of a harder material than the shank 70. For example, the cutting tip 72 is formed of a hard material such as cemented carbide, whereas the shank is formed of a tough but softer material such as steel. The cutting tip 72 comprises a body having a rear supporting surface 100, a front cutting surface 102, and a side surface 104 extending between the cutting surface 102 and the supporting surface 100. An outer peripheral portion 102a of the cutting surface intersects a front portion 104a of the side surface 104 to form a circular cutting edge 106.

Those two surface portions 102a, 104a intersect at a ninety degree angle C (FIG. 12). That is, the outer peripheral portion 102a is oriented perpendicular to a center axis Y of the insert, and the front portion 104a is oriented parallel to that axis Y.

A center portion 102b of the front surface 102 is recessed relative to the outer peripheral portion 102a, wherein the recessed center portion 102b intersects the outer peripheral portion 102a by an acute angle d preferably of about 7° (FIG. 12).

Figure 8:
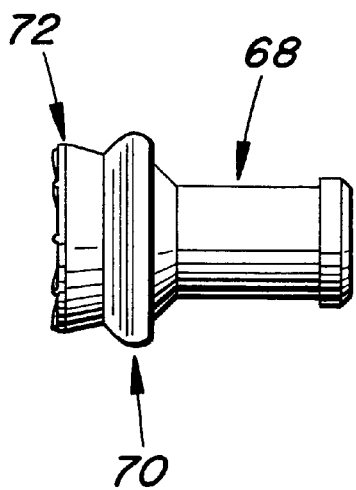
FIG. 8 is a side elevational view of the cutting bit including the shank of FIG. 6 and a cutting tip according to the present invention.
Figure 9:
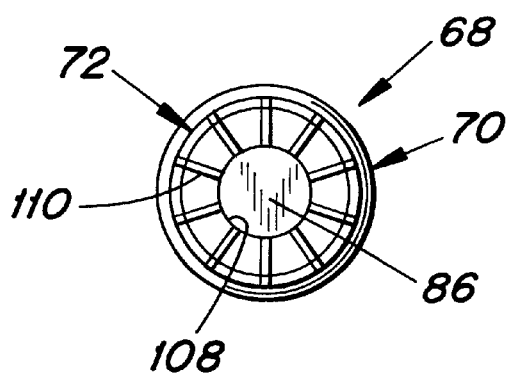
FIG. 9 is a front elevational view of the cutting bit depicted in FIG. 8.

The rear portion 104b extends from the front portion 104a to the supporting surface 100 at an acute angle e, corresponding to the angle b which the inside surface 92 of the lip forms with the center axis X—X. Also, the tip body includes a center through-hole 108 sized to receive the post 86 of the shank. Furthermore, an outer diameter of the supporting surface 100 corresponds to the outer diameter of the flat front face 84 of the shank. Accordingly, when the cutting tip 72 is mounted on the shank, the supporting surface 100 of the tip enters the pocket 90 of the shank, and the center hole 108 receives the post 86, as shown in FIGS. 8 and 9.

After brazing the tip 72 to the shank 70, the steel of the shank cools and shrinks more than does the carbide tip 72. Accordingly, the lip 88 tightly grips the side surface 104 of the tip with a thermal shrink fit, to resist a tendency for chunks of the tip to break-off during a cutting operation after fractures have formed in the tip. Hence, the fractured cutting tip is held together and catastrophic failure of the tip is less likely to occur.

The cutting surface 102 of the tip further includes a plurality of radially extending, circumferentially spaced-apart upstanding ribs 110. Each of the ribs is preferably disposed on both the recessed portion 102b and the outer peripheral portion 102a of the cutting surface 102 and extends preferably from the cutting edge 106 to the through-hole 108. Those ribs tend to promote rotation of the bit 68 during a cutting operation as they are engaged by the material being cut. Consequently, the cutting edge is worn more uniformly as compared with a prior art bit whose rotation is more haphazard.

Figures 5A, 5B:
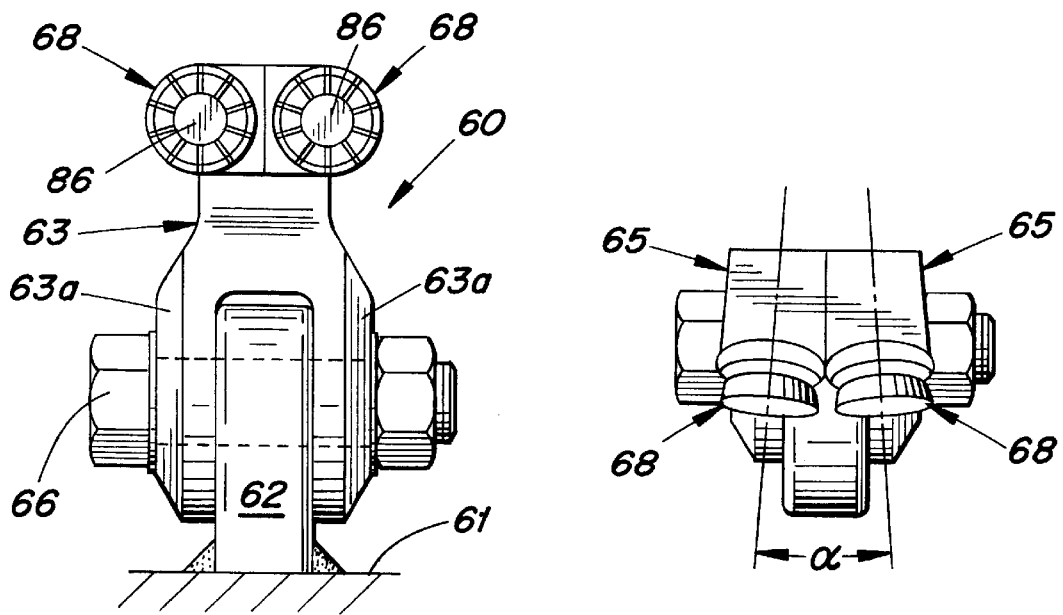
FIG. 5A is a front elevational view of FIG. 4.
FIG. 5B is a top view of FIG. 5A.
Figure 6:
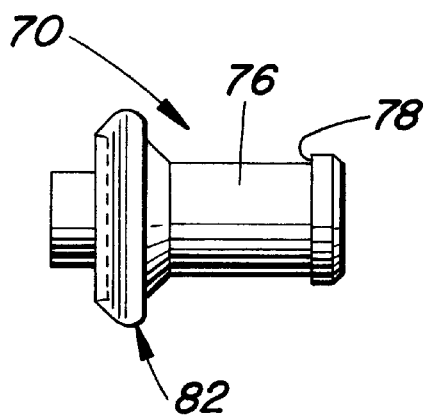
FIG. 6 is a side elevational view of a shank portion of the cutting bit of FIG. 4.

Each cutter bit 68 is formed by brazing the cutting tip 72 in the pocket 90, and to the post 84 of the shank. Upon cooling, the lip 88 of the shank shrinks and tightly grips the side surface 104 of the tip with a thermal shrink fit. Cutter bits 68 are held in respective bores 74 of the holder 63 by means of the split retainer sleeve 80, to enable the bits to be rotatable about the respective axes X—X. The two bits 68 of each holder 63 are forwardly divergent, as shown in FIG. 5B. That is, the axes of the bits form an acute angle $\alpha$, e.g., 10 degrees. Also, with the holder 63 bearing against the stop block 67, the bit axes are inclined upwardly by a slight acute angle $\beta$ relative to a line T oriented tangentially to the drum.

To cut stumps, the drum 61 is rotated and moved toward the stump to bring the cutting tips 72 into engagement therewith to gradually disintegrate the stump. The bits 68 are caused to rotate about the axis X—X during the cutting operation. Such rotation is induced by the presence of the ribs 110 which are abutted by the material, e.g., wood or soil, engaged thereby. Consequently the cutting edge 106 wears in a highly uniform manner.

Moreover, even if fractures occur in the cutting tip 72, catastrophic failure of the tip 72 is less likely to occur, because the radial support of the tip imparted by the lip 88 resists a tendency for large pieces of the tip to fall-off.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A cutting tip for stump cutting comprising a body formed of a hard material, the body having a rear supporting surface, a front cutting surface, and a side surface extending between the supporting surface and the cutting surface; an outer peripheral portion of the cutting surface and a forward portion of the side surface intersecting one another to form a substantially circular cutting edge; an inner portion of the cutting surface disposed radially inwardly of the outer peripheral portion and being axially recessed relative to the outer peripheral portion; a center hole extending axially through the body from the inner portion of the cutting surface to the supporting surface, wherein the inner portion extends from the hole to the outer peripheral portion; and a plurality of circumferentially spaced, raised ribs extending generally radially along at least a portion of the cutting surface.

2. The cutting tip according to claim 1 wherein each of the ribs extends from substantially the cutting edge to substantially the center hole.

3. The cutting tip according to claim 1 wherein the outer peripheral portion of the cutting surface intersects the forward portion of the side surface at substantially a ninety degree angle, the outer peripheral portion extending substantially parallel to the supporting surface.

4. The cutting tip according to claim 1 wherein a rearward portion of the side surface forms an acute angle with the forward portion thereof and converges toward the supporting surface.

5. The cutting bit according to claim 4 wherein a plurality of raised ribs extend generally radially along at least a portion of the recessed inner portion and the outer peripheral portion.

6. The cutting bit according to claim 5 wherein each rib extends from substantially the cutting edge to substantially the center hole.

7. The cutting tip according to claim 1 wherein the body comprises cemented carbide.

8. A cutting bit comprising:
   a shank defining a center axis and having a rear mounting portion and a front head portion, the head portion including a front face having a center post projecting axially from the front face, and a generally circular lip projecting forwardly and extending around an outer periphery of the front face, wherein the front face and the lip form a pocket surrounding the post, the post extending forwardly past the pocket; and
   a cutting tip brazed in the pocket, and comprising a body formed of a harder material than the shank, the body having a front cutting surface, a rear supporting surface engaging the front face of the shank, and a side surface extending between the supporting surface and the cutting surface, the side surface engaging the lip of the shank, an inner portion of the cutting surface being disposed radially inwardly of the outer peripheral portion, and a center hole extending through the body from the cutting surface to the supporting surface and receiving the post.

9. The cutting bit according to claim 8 wherein the outer peripheral portion of the cutting surface intersects the forward portion of the side surface at substantially a ninety degree angle, the outer peripheral portion oriented substantially parallel to the supporting surface.

10. The cutting bit according to claim 9 wherein each rib is situated on both the outer peripheral portion of the cutting surface and the inner portion of the cutting surface.

11. The cutting bit according to claim 8 wherein a rearward portion of the side surface forms an acute angle with the forward portion thereof and converges toward the supporting surface, the lip including an inner surface engaging the rearward portion of the side surface and inclined complementarily thereto.

12. The cutting bit according to claim 8 wherein the lip comprises steel and the cutting tip comprises carbide, the lip gripping the side surface with a thermal shrink fit.

13. A rotary stump cutter comprising:
   a rotary member;
   holders mounted on the member, each holder forming a bore extending generally tangentially relative to an axis of rotation of the member; and
   a cutting bit mounted in each bore and comprising:
      a shank having a mounting portion disposed in the bore and rotatable relative to the holder about a longitudinal axis of the bore, the shank further including a front head portion, the head portion including a front face having a center post projecting axially from the front face, and a generally circular lip projecting forwardly and extending around an outer periphery of the front face, wherein the front face and the lip form a pocket surrounding the post, the post extending forwardly past the pocket; and
      a cutting tip brazed in the pocket, and comprising a body formed of a harder material than the shank, the body having a front cutting surface, a rear supporting surface engaging the front face of the shank, and a side surface extending between the supporting surface and the cutting surface, the lip engaging the side surface with a thermal shrink fit, an outer peripheral portion of the cutting surface and a forward portion of the side surface intersecting one another at substantially a ninety degree angle to form a generally circular cutting edge, an inner portion of the cutting surface disposed radially inwardly of the outer peripheral portion and being recessed relative to the outer peripheral portion thereof, and a center hole extending through the body from the cutting surface to the supporting surface and receiving the post.

14. The stump cutter according to claim 13 wherein each holder includes two bores with respective cutting bits mounted therein, the two bits being forwardly divergent and inclined at an acute angle with respect to a line oriented tangentially to the rotary member.

15. A cutting tip for stump cutting comprising a body formed of a hard material, the body having a rear supporting surface, a front cutting surface, and a side surface extending between the supporting surface and the cutting surface; an outer peripheral portion of the cutting surface and a forward portion of the side surface intersecting one another to form a substantially circular cutting edge; an inner portion of the cutting surface disposed radially inwardly of the outer peripheral portion and being axially recessed relative to the outer peripheral portion; a center hole extending axially through the body from the cutting surface to the supporting surface; and a plurality of circumferentially spaced, raised ribs extending generally radially along at least a portion of the cutting surface; wherein each of the ribs extends from substantially the cutting edge to substantially the center hole.

16. A cutting tip for stump cutting comprising a body formed of a hard material, the body having a rear supporting surface, a front cutting surface, and a side surface extending between the supporting surface and the cutting surface; an outer peripheral portion of the cutting surface and a forward portion of the side surface intersecting one another to form a substantially circular cutting edge; an inner portion of the cutting surface disposed radially inwardly of the outer peripheral portion and being axially recessed relative to the outer peripheral portion; a center hole extending axially through the body from the cutting surface to the supporting surface; and a plurality of circumferentially spaced, raised ribs extending generally radially along at least a portion of the cutting surface; wherein the outer peripheral portion of the cutting surface intersects the forward portion of the side surface at substantially a ninety degree angle, the outer peripheral portion extending substantially parallel to the supporting surface.

17. The cutting tip according to claim 16 wherein each rib is situated on both the outer peripheral portion of the cutting surface and the inner portion of the cutting surface.

* * * * *